US008181999B2

(12) United States Patent
Cromarty

(10) Patent No.: US 8,181,999 B2
(45) Date of Patent: May 22, 2012

(54) PIPE CLAMP

(76) Inventor: Curtis Wade Cromarty, Calgary (CA)

( * ) Notice: Subject to any disclaimer, the term of this patent is extended or adjusted under 35 U.S.C. 154(b) by 130 days.

(21) Appl. No.: 12/816,192

(22) Filed: Jun. 15, 2010

(65) Prior Publication Data
US 2010/0314870 A1 Dec. 16, 2010

Related U.S. Application Data

(60) Provisional application No. 61/187,545, filed on Jun. 16, 2009.

(51) Int. Cl.
F16L 21/00 (2006.01)
(52) U.S. Cl. .......................................... 285/419; 285/421
(58) Field of Classification Search .................. 285/420, 285/421, 412, 413, 368, 419, 373
See application file for complete search history.

(56) References Cited

U.S. PATENT DOCUMENTS

| 715,222 | A | * | 12/1902 | Werth | 285/419 |
|---|---|---|---|---|---|
| 928,896 | A | * | 7/1909 | Bille | 285/412 |
| 1,026,211 | A | * | 5/1912 | Kissinger | 285/420 |
| 1,498,855 | A | * | 6/1924 | Parker | 285/412 |
| 1,693,081 | A | * | 11/1928 | Kass | 285/419 |
| 2,880,761 | A | * | 4/1959 | Peter | 285/419 |
| 3,181,900 | A | * | 5/1965 | Hayward, Jr. | 285/421 |
| 3,376,056 | A | * | 4/1968 | Linstead | 285/421 |
| 3,737,180 | A | * | 6/1973 | Hayes et al. | 285/373 |
| 3,982,779 | A | * | 9/1976 | Hickey | 285/373 |
| 4,615,543 | A | * | 10/1986 | Cannon | 285/419 |
| 4,915,424 | A | * | 4/1990 | Sarno et al. | 285/373 |
| 5,090,742 | A | * | 2/1992 | Cohen et al. | 285/373 |

* cited by examiner

Primary Examiner — David E Bochna
(74) Attorney, Agent, or Firm — Bennett Jones LLP

(57) ABSTRACT

A system for temporarily joining two pipe ends securely in a reversible manner, where the joined pipe will carry fluids or mixed fluids and solids under high pressure and volume. Two clamshell clamps each grip a pipe near its end where two pipes are to be joined and. The clamshell clamps have two mating bodies of semicircular cross-section, pivoting around a hinged edge, so that interlaced flanges on the bodies' other edges meet and between which mated flanges a conical pin is inserted to bias the mating clamp bodies together gripping the pipe inside the tubular enclosure formed by the mating clamp elements. The conical pins are connected so that if the pipes' ends are urged apart, the connected pins are urged between the clamps' flanges forcing the clamps' gripping faces together on the pipes. The clamps may have included gripping elements adjacent on its inner face.

10 Claims, 5 Drawing Sheets

SCHEMATIC ILLUSTRATION OF A PIPE CLAMPING SYSTEM

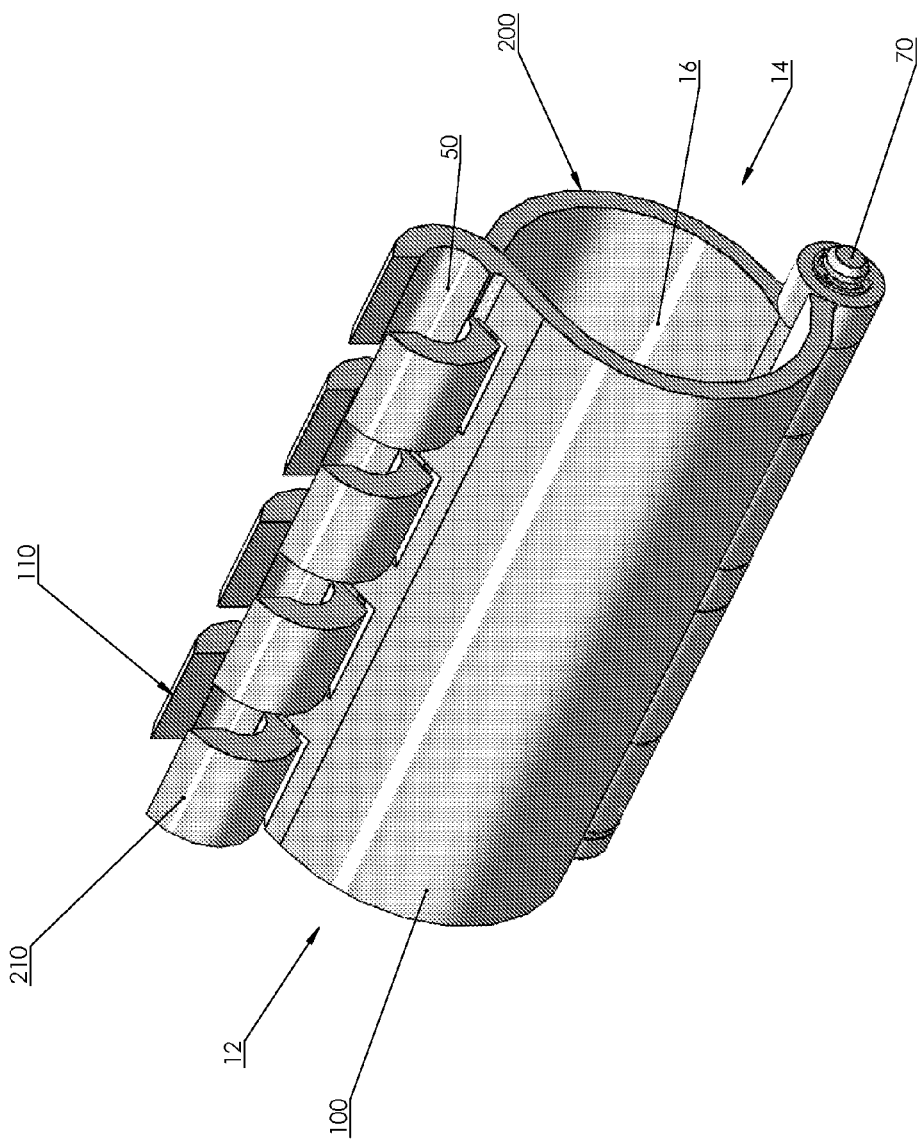
FIG 1 : PERSPECTIVE VIEW OF PIPE CLAMP ASSY

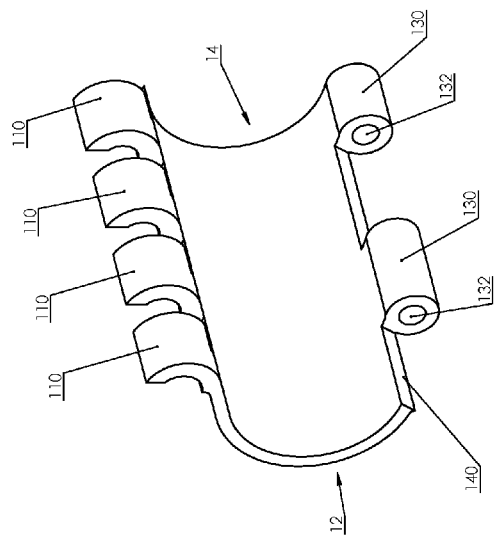

FIG 2: PERSPECTIVE VIEW OF FIRST CLAMP MEMBER (100)

FIRST CLAMP HALF (100)

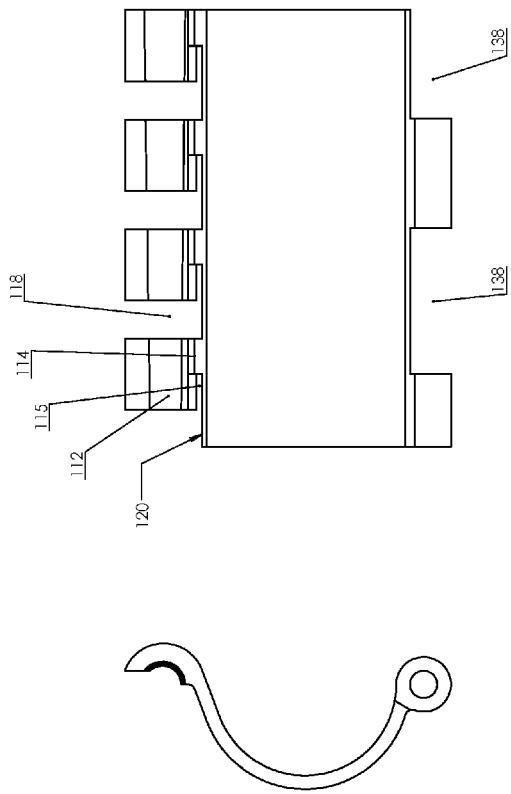

FIG 3: SIDE VIEW OF FIRST CLAMP MEMBER (100)

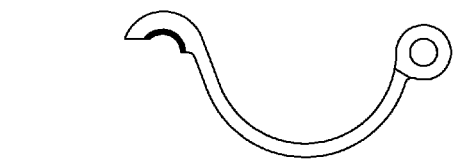

FIG 4: END VIEW OF FIRST CLAMP MEMBER (100)

LEGEND
12 - FIRST END OF THE PIPE CLAMP
14 - SECOND END OF THE PIPE CLAMP
100 - FIRST PIPE CLAMP
110 - JOINING MEMBERS
112 - CONNECTING PORTIONS OF 110
114 - CONNECTING FLANGES OF 110
115 - SLOT BETWEEN 120 AND 112
118 - SPACING BETWEEN JOINING MEMBERS
120 - TOP EDGE OF THE PIPE CLAMP
130 - BOTTOM LOOP MEMBER OF CLAMP
132 - APERATURE OF LOOP MEMBER 230
138 - SPACING BETWEEN LOOP MEMBERS
140 - BOTTOM EDGE OF THE PIPE CLAMP

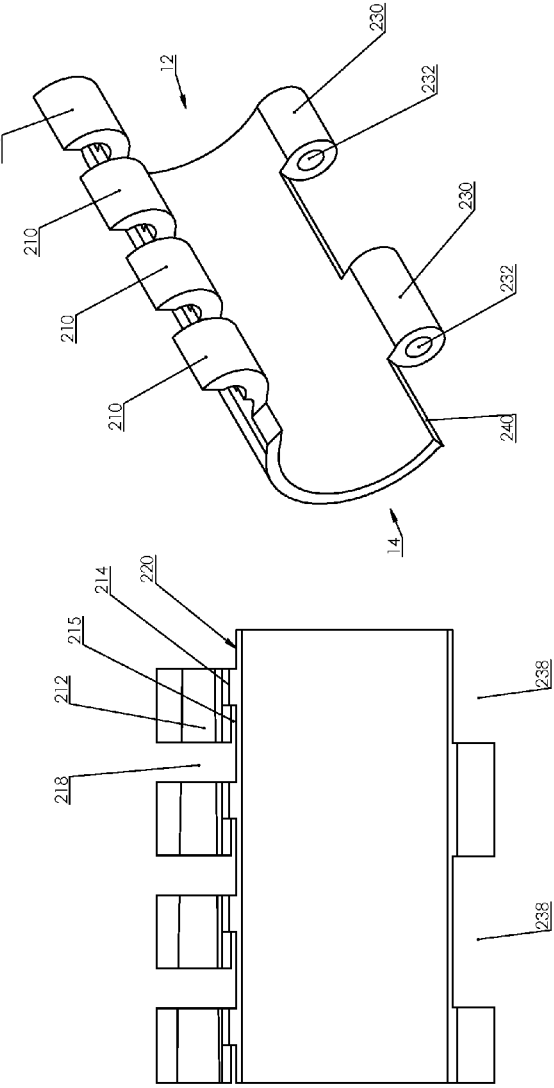

FIG 6: SIDE VIEW OF SECOND CLAMP MEMBER (200)

FIG 5: PERSPECTIVE VIEW OF SECOND CLAMP MEMBER (200)

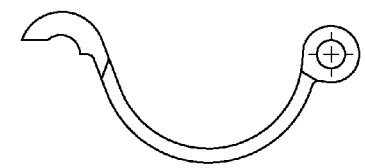

FIG 7: END VIEW OF SECOND CLAMP MEMBER (200)

LEGEND

12 - FIRST END OF THE PIPE CLAMP
14 - SECOND END OF THE PIPE CLAMP
200 - SECOND PIPE CLAMP
210 - JOINING MEMBERS
212 - CONNECTING PORTIONS OF 210
214 - CONNECTING FLANGES OF 210
215 - SLOT BETWEEN 220 AND 212
218 - SPACING BETWEEN JOINING MEMBERS
220 - TOP EDGE OF THE PIPE CLAMP
230 - BOTTOM LOOP MEMBER OF CLAMP
232 - APERATURE OF LOOP MEMBER 230
238 - SPACING BETWEEN LOOP MEMBERS
240 - BOTTOM EDGE OF THE PIPE CLAMP

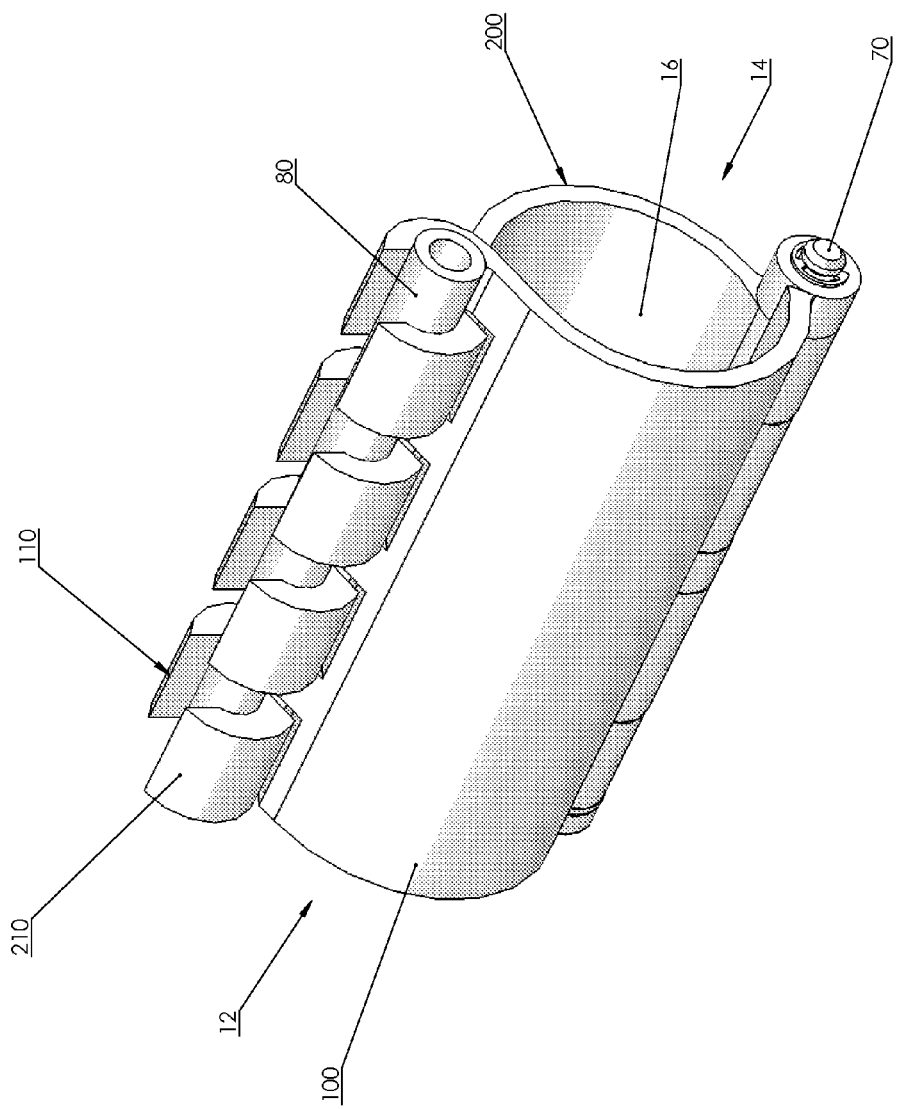
FIG 8 : PERSPECTIVE VIEW OF PIPE CLAMP OF FIG 1 WITH A PIN INSERTED

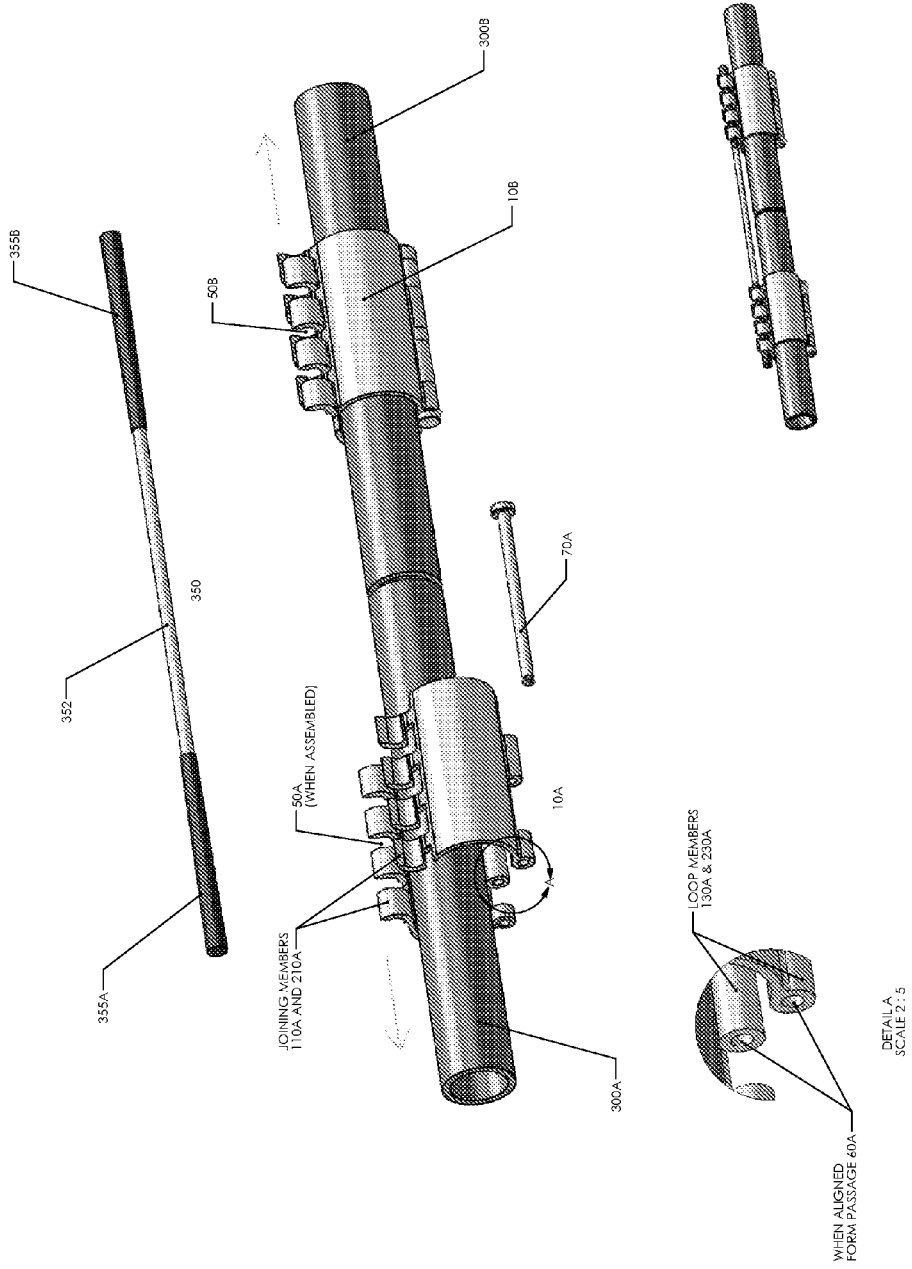
FIG 9 : SCHEMATIC ILLUSTRATION OF A PIPE CLAMPING SYSTEM

PIPE CLAMP

CROSS REFERENCE TO RELATED APPLICATIONS

The present application claims priority under 35 U.S.C. §119(e) to U.S. provisional patent application No. 61/187,545 filed Jun. 16, 2010.

FIELD OF THE INVENTION

The present invention relates to clamps for rigid pipes and more particularly to a system and method for tethering the ends of rigid pipes together.

BACKGROUND OF THE INVENTION

Temporarily joining two rigid pieces of pipe is necessary in a number of industries. These joins can be made by using hammer unions, other types of joins, etc. However, because these joins are only meant to be temporary, they are often not as strong as joins made to permanently connect the ends of two pipes, such as by simply welding the pipes together or coupling them in a more permanent manner. In many cases, especially when the joined pipes are going to be used to convey a highly pressurized fluid, it is often desirable to connect or tether the ends of the pipes together in addition to using the temporary join. In this manner, if the highly pressurized fluid passing through the pipes causes the temporary join to fail (i.e. a blowout), the tethering of the ends of the pipes can keep the ends of the pipes from moving too far. These pipes often also convey gases and solids in addition to or instead of fluids and can be subjected to abrasion and blowouts can release gas into surroundings.

Previously, a number of measures have been taken to attempt to tether the ends of the two pipes together in the event that a temporary coupling fails and the pressurized fluid inside causes the two pipes to blow apart. However, many of these measures have not been all that successful and/or easy to use.

SUMMARY OF THE INVENTION

It is to be understood that other aspects of the present invention will become readily apparent to those skilled in the art from the following detailed description, wherein various embodiments of the invention are shown and described by way for illustration. As will be realized, the invention is capable for other and different embodiments and is several its several details are capable of modification in various other respects, all without departing from the spirit and scope of the present invention. Accordingly the drawings and detailed description are to be regarded as illustrative in nature and not as restrictive.

The invention is of a pipeline joining clamp system for holding two rigid pipes' ends together in a reversible or temporary manner, comprising:

a. Two clamshell clamps, each comprising:
  i. A first half comprising
    1. a half-pipe of semicircular cross-section the inner surface of which is sized to match and mate with the outer surface of a pipe to be joined near the joint
    2. a loop attached to a straight edge of the half-pipe
    3. a finger attached to the opposite edge of the half-pipe
  ii. a second half comprising
    1. a second half-pipe of similar diameter to the first
    2. a loop attached to a straight edge of the second half-pipe
    3. a finger attached to the opposite edge of the second half-pipe
  iii. a pin which inserted into the loops of the two half-pipes forms a hinge, constraining the half-pipes to rotate about the hinge to form a tube when closed
  iv. the tube when closed having the fingers of the first and second half-pipes interleaved form an approximately cylindrical space between the interleaved fingers to receive a second pin
  v. the second pin or the space between the fingers or both being conical in shape, tapered along the length of the tube with the small end of the taper closest to a second clamshell clamp
b. a similar second clamshell clamp, formed to receive a third pin to form a hinge and a fourth pin to hold the half-pipes together, with the taper of the conical fourth pin or space for the fourth pin having its small end closest to the first clamp
c. the second and fourth pins joined together such that if the clamps are moved apart along the pipes upon which they are deployed, those pins are held immovable with respect to each other and the spaces between the fingers of the clamps are forced such that the clamps are further tightened about the pipes.

The invention also provides for a method of joining and holding two pipes of similar diameter butted end to end, comprising the steps of:
a. applying a clamshell clamp to one pipe near the joint with its tapered fingers, if any, aligned small end toward the pipe joint
b. applying the other clamshell clamp to the other pipe near the joint with its tapered fingers, if any, aligned small end toward the pipe joint
c. inserting the second pin into the first clamshell clamp
d. inserting the connected fourth pin into the second clamshell clamp
e. sliding each clamshell clamp away from the other, roughly equidistant from the pipe joint until the connection between the second and fourth pins is taut and those pins engage the clamshell clamps' half-pipes closing them to clamp each pipe where applying a clamp comprises the steps of:
f. placing one half-pipe of a clamp on the pipes
g. placing the other half-pipe on the opposite side of the pipe so that the fingers interleave, forming a pin-receiving space
h. inserting a tightening pin (the second pin of the apparatus) to temporarily hold the half-pipes over the pipe
i. inserting a hinge pin (the first pin of the apparatus) in the loops of the two half-pipes to form a hinge
j. loosening or removing the tightening pin (the second pin)
k. sliding the clamp to a desired location along the pipe
l. moving the tightening pin and clamps to force the two half-pipes to clamp the pipe.

The method may include the additional step: performing the steps f. through l. on the second pipe where the desired location of each clamp is roughly equidistant from the pipes' joint with the pin connector taut and the tightening pins causing both clamps to exert sufficient clamping force to hold their respective clamped pipe.

BRIEF DESCRIPTION OF THE DRAWINGS

Referring to the drawings wherein like reference numerals indicate similar parts throughout the several views, several aspects of the present invention are illustrated by way of example, and not by way of limitation, in detail in the figures, wherein:

FIG. 1 is a perspective view of a pipe clamp;
FIG. 2 is a perspective view of a first clamp member;
FIG. 3 is a side view of the first clamp member of FIG. 2;
FIG. 4 is an end view of the first clamp member of FIG. 2;
FIG. 5 is a perspective view of a second clamp member;
FIG. 6 is a side view of the second clamp member of FIG. 5;
FIG. 7 is an end view of the second clamp member of FIG. 5;
FIG. 8 is a perspective view of the pipe clamp of FIG. 1 with a pin inserted through joining members on the pipe clamp; and
FIG. 9 is schematic illustration of a pipe clamping system.

DETAILED DESCRIPTION

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

FIG. 1 illustrates a pipe clamp 10 in one aspect. The pipe clamp 10 is adapted to be placed around a tubular pipe (not shown) and secured in place over the pipe. The pipe clamp 10 can have a first clamp member 100 and a second clamp member 200 that are configured to curve around and enclose a rigid pipe (not shown) in a passage 16 formed by the first clamp member 100 and the second clamp member 200. The first clamp member 100 and the second clamp member 200 each have a number of joining members or fingers 110 and 210 attached to top edges 120 and 220 of the first clamp member 100 and the second clamp member 200 respectively, and a number of loop members 130, 230 attached to bottom edges 140, 240 of the first clamp member 100 and the second clamp member 200, respectively.

Referring to FIGS. 2, 3 and 4, each joining member 110 can be connected to the top edge 120 of the first clamp 100 can be separated from an adjacent joining member 110 by a spacing 118. Each joining member 110 can also be made up of a connecting portion 112 and a flange 114 such that the flange 114 connects the connecting portion 112 to the top edge 120 of the first clamp member 100. The connecting portion 112 and the top edge 120 of the first clamp member 100 can define a slot 115 that is open at a first end at a spacing 118. The slot 115 can end at an other end by the flange 114.

Referring to FIG. 4, in a preferred embodiment, each of the connecting portions 112 of the joining members or fingers 110 can be curved in a direction that is opposite to the direction of curvature of the first clamp member 100.

Referring again to FIGS. 2, 3 and 4, in a preferred embodiment, loop members 130 connected to the bottom edge 140 of the first clamp members 100 can be separated from adjacent loop members 130 by spacings 138. Each loop member 130 can also have an aperture 132 passing through the loop member 130.

Referring to FIGS. 5, 6 and 7 the second clamp member 200 can be configured similar to the first clamp member 100 with the joining members 210 attached to the top edge 220 of the second clamp member 200 and separated from adjacent joining members 210 by spacings 218. Each joining member 210 can have a connecting portion 212 that is attached to the top edge 220 of the second clamp 200 by a flange 214. Slots 215 can be defined between the connecting portion 212 and the top edge 220 of the second clamp member 200.

Referring to FIG. 7, the connecting portion 212 of the joining members 212 can be curved with the direction of curvature of the connecting portion 212 of the joining member 212 being opposite to the direction of curvature of the second clamp member 200.

Referring again to FIGS. 5, 6 and 7, loop members 230 can be provided on the bottom edge 240 of the second clamp member 200. The loop members 230 can be separated from adjacent loop members 230 by spacings 238. Each loop member 230 can have an aperture 232 passing through it.

Referring again to FIG. 1, the spacings 118 between the connecting portions 112 of the joining members 110 attached to the first clamp member 100 can be sized to allow the flanges 214 of the joining members 210 attached to the second clamp member 200 to pass between these spacings 118. In this manner, the flanges 214 of the joining members 210 attached to the second clamp member 200 can be slid through the spacings 118 until the flanges 214 lie adjacent to the top edge 120 of the first clamp member 100. The first clamp member 100 and the second clamp member 200 can then be slid relative to each other so that each flange 214 of the joining members 210 slides through the corresponding slot 115 defined by the joining members 110 and the top edge 120 of the first clamp member 100 until the joining members 110 attached to the first clamp member 100 align with the joining members 210 attached to the second clamp member 200, as shown in FIG. 1, thereby interlocking the joining members 110 attached to the first clamp member 100 and the joining members 210 attached to the second clamp member 200.

With the joining members 110 and the joining members 210 interlocked, the joining members 110 attached to the first clamp member 100 may lie across from the joining members 210 attached to the second clamp member 200 with the joining members 110 attached to the first clamp member 100 and the joining members 210 attached to the second clamp member 200 corresponding to form a generally cylindrical passage 50 running between the joining members 110, 210. In one aspect, the generally cylindrical passage 50 can be slightly tapered as it runs from a first end 12 to a second end 14 of the pipe clamp 10.

Alternatively or additionally, the spacings 218 between the connecting portions 212 of the joining members 210 attached to the second clamp member 200 can be sized to allow the flanges 114 of the joining members 110 attached to the first clamp member 100 to pass through these spacings 218. This allows the joining members 110, 210 to be interlocked by sliding the flanges 114 of the joining members 110 through the spacings 218.

The slots 115, 215 defined between the connecting portion 112, 212 of the joining members 110, 210 and the top edges 120, 220 of the first and second clamp members 100, 200 can be sized large enough so that the first clamp member 100 and the second clamp member 200 can pivot at the top edges 120, 220 allowing the bottom edges 140, 240 of the first clamp member 100 and the second clamp member 200 to be moved towards and away from each other.

With the joining members 110, 210 interlocked, the first clamp member 100 and the second clamp member 200 can be pivoted relative to one another, around the top edges 120, 220 of the first clamp member 100 and the second clamp member 200, respectively, so that the loop members 130 attached to the bottom edge 140 of the first clamp member 100 and the loop members 230 attached to the bottom edge 240 of the second clamp member 200 align with one another. Typically, the loop members 130 attached to the bottom end 140 of the first clamp member 100 will have the spacings 138 between adjacent loop members 130 positioned to correspond with the loop members 230 attached to the bottom end 240 of the second clamp member 200 and the spacings 238 between the adjacent loop members 230 on the bottom end 240 of the second clamp member 200 can be positioned to correspond to the loop members 130 on the bottom edge 140 of the first clamp member 100. In this manner, the apertures 132, 232 in the loop members 130, 230 can align coaxially, forming a passage 60 running through the apertures 132, 232 of the loop members 130, 230 from the first end 12 of the pipe clamp 10 to the second end 14.

With the loop members 130, 230 aligned and forming the passage 60 with the apertures 132, 232 in the loop members 130, 230, a shaft 70 can be inserted through the passage 60 and secured in place, thereby securing the bottom edges 140, 240 of the first clamp member 100 and the second clamp member 200 relative to one another.

FIG. 8 illustrates the clamp 10 with a pin 80 inserted through the passage 50 formed by the joining members 110, 210. With the shaft 70 inserted through the loop members 130, 230 and holding the bottom edges 140, 240 relative to one another, a pin 80 can be inserted through the passage 50 formed by the joining members 110, 210 to secure the top ends 120, 220 of the first clamp member 100 and the second clamp member 200 relative to one another. The pin 80 can force the joining members 110, 210 outwards and away from each other, which will thereby force the first clamp member 100 and the second clamp member 200 towards each other.

In a preferred embodiment, the pin 80 is slightly tapered along its length. In another aspect, the passage 50 might be slightly tapered along its length. In yet another aspect, both the pin 80 and the passage 50 might be slightly tapered along their lengths.

In one aspect, the inner surfaces of the pipe clamps may be smooth along the full length In another aspect, the inner surfaces of the pipe clamps may be concentrically ridged along the full length. Or in yet another aspect, the surface may have raised protrusions along the full length. In other aspects not limited to the descriptions above, the inner surface of the pipe clamp may be configured to enhance grip or friction with the pipe's outer surface.

In operation, the pipe clamp 10 can be installed around a rigid pipe (not shown) and then clamped to the pipe. The first clamp member 100 and the second clamp member 200 can be provided on either side of the pipe so that the pipe passes through the passage 16 formed by the first clamp member 100 and the second clamp member 200. The joining members 110 attached to the top edge 120 of the first clamp member 100 can then be connected to the joining members 210 attached to the top edge 220 of the second clamp member 200 by sliding the flanges 114 through the spacings 218 or the flanges 214 through the spacings 118. The first clamp member 100 can then be slid relative to the second clamp member 200 so that the joining members 110 on the first clamp member 100 and the joining members 210 on the second clamp member 200 can be aligned. The first clamp member 100 and the second clamp member 200 can then be pivoted relative to one another and around the pipe so that the loop members 130 on the bottom end 140 of the first clamp member 100 and the loop members 230 on the bottom end 240 of the second clamp member 200 can align with their apertures 132, 232 forming the passage 60. The shaft 70 can then be slid through the passage 60 securing the bottom edges 140, 240 of the first clamp member 100 and the second clamp member 200 relative to each other. The first clamp member 100 and second clamp member 200 will at this point be surrounding the pipe. The pin 80 can be inserted in the passage 50, formed by the joining members 110, 210, which can force the joining members 110, 210 away from each other and thereby forcing the first clamp member 100 towards the second clamp member 200 and around the pipe.

FIG. 9 shows a first pipe clamp 10A and a second pipe clamp 10B for use in tethering the ends of two pipes 300A and 300B together that are temporarily joined, such as with a hammer union, to prevent the ends of the pipes 300A and 300B from moving apart in the event that the joint fails, such as when the pressure of the fluid passing through the pipes 300A and 300B causes a blowout at the joint.

In a preferred method, to tether the two pipes 300A and 300B together, the first pipe clamp 10A can be positioned around an end of the first pipe 300A with the first clamp member 100A and the second clamp member 200A provided on either side of the first pipe 300A. The joining members 110A, 210A on the first pipe clamp 10A can then be interlocked. The first clamp member 100A and the second clamp member 200A can then be pivoted to enclose the first pipe 300A until the loop members 130A and 230A are aligned. A shaft 70A can then be inserted through the passage 60A formed by the aligned apertures 132A and 232A of the loop members 130A and 230A.

The second clamp 10B can be installed on the second pipe 300B, by placing the first clamp member 100B and the second clamp member 200B around the end of the second pipe 300B and interlocking the joining members 110B and 210B together. The first clamp member 100B and the second clamp member 200B can then be pivoted relative to one another until the loop members 130B and 230B align and form the passage 60B. The shaft 70B can then be inserted through the passage 60B securing the bottom edges 140B and 240B of the first clamp member 100B and the second clamp member 200B relative to one another.

A tether 350 having a first end pin 355A and a second end pin 355B with a cable 352 connected between the first end pin 355A and the second end pin 355B can be provided. In one aspect, the first end pin 355A and the second end pin 355B may be tapered, increasing in diameter away from the cable 352. The tether 350 can be used to secure the first clamp 10A and the second clamp 10B to the respective pipes 300A and 300B and to hold the ends of the two pipes 300A and 300B in the event of a blowout.

In one aspect, the tether 350 can be used to secure the first pipe clamp 10A and the second pipe clamp 10B in place by sliding the cable 352 of tether 350 between the tops of the joining members 110A, 210A of the first pipe clamp 10A and the joining members 110B, 210B of the second pipe clamp 10B, where a space is formed. By passing the cable 352 through these spaces, the cable 352 can run through the passage 50A formed by the joining members 110A, 210A of the first pipe clamp 10A, and the passage 50B formed by the joining members 110B, 210B of the second pipe clamp 10B. The first pipe clamp 10A and the second pipe clamp 10B can then be slid away from each other along the first pipe 300A and the second pipe 300B respectively, until the larger first end pin 355A is moved into the passage 60A and the second end pin 355B is moved into the passage 60B, causing the pipe clamps 10A, 10B to clamp onto their respective pipes 300A, 300B with the cable 352 securing the ends of the pipes 300A, 300B relative to one another in the event of a failure of the temporary join.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claim.

The invention claimed is:

1. A pipeline joining clamp system for holding two pipes' ends together in a reversible or temporary manner, comprising:
   a. Two clamshell clamps, each comprising:
      i. A first half comprising
         1. a half-pipe of semicircular cross-section the inner surface of which is sized to match and mate with the outer surface of a pipe to be joined near the joint
         2. a loop attached to a straight edge of the half-pipe
         3. a finger attached to the opposite edge of the half-pipe
      ii. a second half comprising
         1. a second half-pipe of similar diameter to the first
         2. a loop attached to a straight edge of the second half-pipe
         3. a finger attached to the opposite edge of the second half-pipe
      iii. a pin which inserted into the loops of the two half-pipes forms a hinge, constraining the half-pipes to rotate about the hinge to form a tube when closed
      iv. the tube when closed having the fingers of the first and second half-pipes interleaved forming a space between the interlocked fingers to receive a second pin
      v. the second pin or the space between the fingers or both being conical in shape, tapered along the length of the tube
   b. a similar second clamshell clamp, formed to receive a third pin to form a hinge and a fourth pin to hold the half-pipes together
   c. the second and fourth pins connected together such that if the clamps are moved apart along the pipes upon which they are deployed, those pins are held immovable with respect to each other and the spaces between the fingers of the clamps are forced such that the clamps are tightened about the pipes.

2. The clamps of claim 1 with more than two loops.
3. The clamps of claim 1 with more than two fingers.
4. The clamps of claim 1 where the second and fourth pins are connected by a cable.
5. The clamps of claim 1 where the inner surface of the half-pipe is provided with a friction or grip enhancing feature or coating.
6. The clamps of claim 1 where the fingers when interleaved together to form the two half-pipes into a hinged tubular clamp are configured to also slideably interlock with each other when one half-pipe is moved along a line formed at the half-pipes' edge-to-edge joint.
7. The clamp of claim 6 where the fingers of each half pipe are each joined with a flange and a slot and the flange of the finger on one half-pipe are slideably mate-able with the slot on the other half-pipe when the half-pipes are adjacent to each other to hold the half-pipes together on the pipe to be clamped while their hinge is assembled.
8. A method of joining and holding two pipes of similar diameter butted end to end, comprising the steps of:
   a. applying the clamshell clamp of claim 1 to one pipe near the joint with its tapered fingers, if any, aligned small end toward the pipe joint
   b. applying the other clamshell clamp of claim 1 to the other pipe near the joint with its tapered fingers, if any, aligned small end toward the pipe joint
   c. inserting the second pin into the first clamshell clamp
   d. inserting the connected fourth pin into the second clamshell clamp
   e. sliding each clamshell clamp away from the other, roughly equidistant from the pipe joint until the connection between the second and fourth pins is taut and those pins engage the clamshell clamps' half-pipes closing them to clamp each pipe.
9. The method of claim 8 where applying the clamp system comprises the steps of:
   a. placing one half-pipe of one clamp on the pipes
   b. placing the other half-pipe on the opposite side of the pipe so that the fingers interleave, forming a pin-receiving space
   c. inserting the second pin to temporarily hold the half-pipes over the pipe
   d. inserting the hinge pin in the loops of the two half-pipes to form a hinge
   e. loosening or removing the second pin
   f. sliding the clamp to a desired location along the pipe
   g. moving the second pin to force the two half-pipes to clamp the pipe.
10. The method of claim 9 with the additional step:
   h. performing the operations a.-g. with the second clamp on the second pipe where the desired location of each clamp is roughly equidistant from the pipes' joint with the connector connecting the second and fourth pins taut and the second and fourth pins causing both clamps to exert sufficient clamping force to hold their respective clamped pipe.

* * * * *